US010480657B1

(12) United States Patent
Yandle, II et al.

(10) Patent No.: US 10,480,657 B1
(45) Date of Patent: Nov. 19, 2019

(54) MECHANICAL PUMP SEAL

(71) Applicants: S. Elwood Yandle, II, New Orleans, LA (US); S. Elwood Yandle, III, Belle Chasse, LA (US)

(72) Inventors: S. Elwood Yandle, II, New Orleans, LA (US); S. Elwood Yandle, III, Belle Chasse, LA (US)

(73) Assignee: S. E. Yandle, II, New Orleans, LA (US)

( * ) Notice: Subject to any disclaimer, the term of this patent is extended or adjusted under 35 U.S.C. 154(b) by 73 days.

(21) Appl. No.: 15/729,388

(22) Filed: Oct. 10, 2017

Related U.S. Application Data

(60) Provisional application No. 62/405,682, filed on Oct. 7, 2016.

(51) Int. Cl.
*F16J 15/34* (2006.01)
*F04D 29/12* (2006.01)

(52) U.S. Cl.
CPC ............ *F16J 15/348* (2013.01); *F04D 29/12* (2013.01); *F16J 15/3464* (2013.01); *F04D 29/126* (2013.01)

(58) Field of Classification Search
CPC ........ F16J 15/3464; F16J 15/348; F16J 15/38; F04D 29/12; F04D 29/126
See application file for complete search history.

(56) References Cited

U.S. PATENT DOCUMENTS

| 2,383,667 | A | * | 8/1945 | Matter | F16J 15/36 277/366 |
| 3,025,070 | A | * | 3/1962 | Copes | F16J 15/38 277/370 |
| 3,612,548 | A | * | 10/1971 | Tracy | F16J 15/38 277/385 |
| 3,672,689 | A | * | 6/1972 | Hadley | F16J 15/38 277/373 |
| 3,889,960 | A | * | 6/1975 | Wiese | F04D 29/128 277/397 |
| 4,361,334 | A | * | 11/1982 | Amorese | F16J 15/162 277/366 |
| 4,648,605 | A | | 3/1987 | Marsi | |
| 4,659,092 | A | * | 4/1987 | Wallace | F16J 15/3468 277/360 |
| 5,605,436 | A | * | 2/1997 | Pedersen | F04D 29/128 277/368 |

(Continued)

*Primary Examiner* — Nicholas L Foster
(74) *Attorney, Agent, or Firm* — Garvey, Smith & Nehrbass, Patent Attorneys, L.L.C.; Charles C. Garvey, Jr.; Seth M. Nehrbass

(57) ABSTRACT

An improved mechanical seal and repair method can be used with mechanical pump seal assemblies. The improved seal utilizes rotating and non-rotating sections of improved configuration, each of which can form a seal using a standard size carbon-face O-ring. The rotating section includes an upper seal member and a lower drive member, the upper seal member being made of a first material and the lower drive member being made of a second material, the upper seal member and the lower drive member being connected such that movement of the lower drive member causes movement (rotation) of the upper seal member. The mechanical seal can be in the form of replacement parts that replace the old parts without modifications to the overall seal and assembly.

20 Claims, 11 Drawing Sheets

(56) References Cited

U.S. PATENT DOCUMENTS

| | | | | |
|---|---|---|---|---|
| 7,204,490 B2 * | 4/2007 | Huang | ................ | F16J 15/3464 |
| | | | | 277/372 |
| 7,699,579 B2 | 4/2010 | Yandle, II | | |
| 8,033,549 B2 * | 10/2011 | Huang | ................ | F16J 15/3484 |
| | | | | 277/366 |
| 8,302,971 B2 * | 11/2012 | Huang | ................ | F04B 53/164 |
| | | | | 277/370 |
| 2007/0224036 A1 * | 9/2007 | Yandle | ................... | F04D 13/08 |
| | | | | 415/170.1 |

* cited by examiner

MECHANICAL PUMP SEAL

CROSS-REFERENCE TO RELATED APPLICATIONS

Priority of U.S. Patent Application Ser. No. 62/405,682, filed 7 Oct. 2016, which is incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to mechanical seal assemblies for pumps. More particularly, the present invention relates to an improved mechanical pump seal assembly that includes a specially configured seal cartridge enabling standard O-rings to be used instead of specially configured Teflon® seals and that can be used as a retrofit for existing mechanical seal assemblies associated with pumps such as barge pumps.

2. General Background of the Invention

An example of a mechanical seal assembly is shown in the U.S. Pat. No. 4,648,605 issued to Joseph Marsi and entitled "Mechanical Seal Assembly". The '605 patent discloses a mechanical seal assembly especially adaptable for use in the chemical industry in which a jacket that is impervious to the chemical involved surrounds a spring which urges seal faces toward one another, the spring being capable of transmitting torque and providing axial support to the jacket.

At the Flowserve website (www.flowserve.com), a number of pump sealing arrangements are displayed. The home page for seals is www.flowserve.com/Seals/seals.htm. One of the seals disclosed at the website is called a "UC" seal. The UC seal is designed for corrosive/non-corrosive high pressure services with a specific gravity of 0.45 or higher. The canned "UC" seal design incorporates a high pressure design feature that is similar to the Flowserve "U" seal while incorporating an encapsulated graphite gasketed silicon carbide rotating face. The UC seal's canned face design provides for low level emissions control.

Borg Warner sells mechanical seals for pumps such as barge pumps under its product designations U2250 and U1875. These seal designs utilize a cylindrically shaped sleeve that fits in between the pump shaft and a seal cartridge that employs a U-shaped cup seal. Over time, the sleeve can be fret damaged by the cup seal.

Fret damage occurs as a result of the original factory Teflon® U-cup moving up and down on the shaft sleeve. The U-cup (when in operation) is inflated by the product being pumped under pressure, thus putting pressure on the shaft sleeve. The Teflon® U-cup under such pressure will scratch the sleeve. These resulting scratches can be described as fret damage. This fret damage can cause leaking of gases to occur through the Teflon® U-cup. In addition, once the pressure is relieved, the U-cup deflates, which can allow leakage of gases through the U-cup, even if it is not fret-damaged.

Incorporated herein by reference are U.S. Provisional Patent Application Ser. No. 60/654,217, filed 18 Feb. 2005, U.S. patent application Ser. No. 11/356,684, filed 18 Feb. 2006, and U.S. Pat. No. 7,699,579. Seals shown in U.S. Pat. No. 7,699,579 are commercially available from Industrial Pump Sales, Inc., 2814 Engineers Road Belle Chasse, La. 70037, and can be viewed at http://www.industrialpump-sales.com/ips/?page_id=7.

BRIEF SUMMARY OF THE INVENTION

The present invention provides an improved seal arrangement for sealing a sleeve having a UC type seal such as those offered by Flowserve® or Borg Warner® model U2250 or U1875 mechanical seals. It includes a rotating seal element similar to the rotating seal element 43 shown in FIG. 6 of U.S. Pat. No. 7,699,579, but instead of the single stainless steel rotating seal element 43, it includes a stainless steel portion and a hardened portion which can for example be made of silicon carbide or tungsten carbide (or even carbon, but that is not preferred as it would not last as long as the carbide portions). The hardened portion can be coated using a process known as "diamond like coating" (DLC). This process is described, for example, at http://www.ibccoating-s.com/dlc-coating-diamond-like-carbon-coating-ceratough-d, incorporated herein by reference.

The present invention provides advantages over prior art seal arrangements. The present invention enables the reuse of fret damaged seal sleeves. The seal sleeve can be reused because the new rotating face uses a different area on the shaft seal sleeve to accomplish a seal.

The present invention enables the use of standard size readably available O-rings. The present invention enables the use of standard rubber or synthetic rubber O-rings throughout the seal assembly, such as O-rings made of Kalrez® brand material or Chemraz brand material or FFKM brand material (from Parker) or generic equivalents of any of these (such as perfluoroelastomer, preferably high performance perfluoroelastomer). The present invention does not require modifications to the seal sleeve or cartridge. The seal sleeve is a component part of the whole cartridge seal assembly. The present invention provides a pump seal repair kit that can be field installed.

The present invention includes a pump apparatus, comprising:

a) a pump housing that is configured to be mounted to a transverse or horizontal surface (e.g., deck) and the extend vertically below the horizontal surface or deck, the pump housing having a pump head;

b) a pump shaft extending vertically in the housing;

c) a driver that rotates the pump shaft; and d) a mechanical seal that prevents leakage of the barge cargo from a tank of the barge to the surrounding atmosphere, the seal including:

a seal flange that attaches to the pump head, the seal flange having a central flange opening receptive of the pump shaft and an annular socket surrounding the central flange opening;

a sleeve that closely fits the pump shaft, being attached to the pump shaft and rotating therewith;

an annular non-rotating seal element that seats upon the seal flange socket, the non-rotating seal element providing a carbon containing sealing face;

an annular rotating seal element that is in face-to-face contact with the carbon containing sealing face, said rotating seal element having an open center and being mounted upon the sleeve at the open center;

a spring assembly that biases the seal elements together, the spring assembly having an open center that receives the sleeve and shaft, one end of the spring assembly bearing against the sleeve, the other end of the spring assembly bearing against the rotating seal element;

a plurality of O-rings that are carried by the seal members, one O-ring attached to the non-rotating seal element and another O-ring attached to the rotating seal element.

Preferably, the rotating seal member is of a metallic material. Preferably, the non-rotating seal member is of a non-metallic material. Preferably, the spring assembly and rotating seal member are interconnected.

Preferably, the O-rings are circular in transverse cross section; preferably, the O-rings are of uniform transverse cross section; preferably, one or more of the O-rings are of a Kalrez® brand material or generic equivalents thereof.

Preferably, the sleeve has an annular shoulder and the spring assembly bears against the annular shoulder of the sleeve. Preferably, the sleeve has multiple sections of varying outer diameter. Preferably, one of the O-rings contacts the pump shaft. Preferably, one of the O-rings contacts the seal flange.

The present invention also includes a barge pump seal apparatus for sealing leakage around the pump shaft of a barge pump having a pump housing that is configured to be mounted to a barge deck and the extend vertically below deck, the pump housing having a pump head and a driver that rotates the pump shaft, said seal apparatus comprising:

a) a seal flange that attaches to the pump head, the seal flange having a central flange opening receptive of the pump shaft and an annular socket surrounding the central flange opening;

b) a sleeve that closely fits the pump shaft, being attached to the pump shaft and rotating therewith;

c) an annular non-rotating seal element that seats upon the seal flange socket, the non-rotating seal element providing a carbon containing sealing face;

d) an annular rotating seal element that is in face-to-face contact with the carbon containing sealing face, said rotating seal element having an open center and being mounted upon the sleeve at the open center;

e) a spring assembly that biases the seal elements together, the spring assembly having an open center that receives the sleeve and shaft, one end of the spring assembly bearing against the sleeve, the other end of the spring assembly bearing against the rotating seal element; and f) a plurality of O-rings that are carried by the seal members, one O-ring attached to the non-rotating seal element and another O-ring attached to the rotating seal element. Preferably, the rotating seal member is of a metallic material. Preferably, the non-rotating seal member is of a non-metallic material. Preferably, the spring assembly and rotating seal member are interconnected.

Preferably, the O-rings are circular in transverse cross section; preferably, the O-rings are of uniform transverse cross section; preferably, one or more of the O-rings are of a Kalrez® brand material or generic equivalents thereof.

Preferably, the sleeve has an annular shoulder and the spring assembly bears against the annular shoulder of the sleeve. Preferably, the sleeve has multiple sections of varying outer diameter.

The present invention also includes a pump seal apparatus for sealing leakage around the pump shaft of a pump having a pump housing and a driver that rotates the pump shaft relative to the housing, said seal apparatus comprising:

a) a seal flange that attaches to the pump housing, the seal flange having a central flange opening receptive of the pump shaft and an annular socket surrounding the central flange opening;

b) a sleeve that closely fits the pump shaft and being attached to the pump shaft and rotating therewith;

c) an annular non-rotating seal element that seats upon the seal flange socket and connects to the seal flange, the non-rotating seal element providing a carbon containing sealing face;

d) an annular rotating seal element that is in face-to-face sealing contact with the carbon-containing sealing face, said rotating seal element having an open center and being mounted upon the sleeve at the open center, the contact defining a gas seal that prevents leakage of gas molecules, the sealing face and the rotating seal element each having a flatness of not more than two light bands (but preferably not more than one light band—the flatness is desirable to minimize leakage and accomplish sealing.

e) a spring assembly that biases the seal elements together, the spring assembly having an open center that receives the sleeve and shaft, one end of the spring assembly bearing against the sleeve, the other end of the spring assembly bearing against the rotating seal element; and f) a plurality of O-rings that are carried by the seal members, one O-ring attached to the non-rotating seal element and another O-ring attached to the rotating seal element. Preferably, non-rotating seal element is of a seal-grade silicon carbide. Preferably, the non-rotating seal element is of a seal-grade carbon material. Preferably, the non-rotating seal member is of a non-metallic material. Preferably, the rotating seal element is of a stainless steel material. Preferably, there is a spring that urges the seal elements together.

Preferably, one or more of the O-rings are of a Kalrez® brand material or generic equivalents thereof. Preferably, the sleeve has an annular shoulder that transfers load between the sleeve and the spring. Preferably, the spring rotates with the sleeve.

The present invention also includes a mechanical pump seal assembly for sealing a rotatable pump shaft, a sleeve that is fitted to the shaft for rotation therewith, and a stationary housing containing a chemically active fluid, comprising:

a) a stationary seal ring section connected to said sleeve;

b) a rotatable ring section connected to said sleeve;

c) seal faces on said seal rings opposed to one another;

d) wherein each ring section has an annular groove;

e) an O-ring that occupies each annular groove;

f) wherein one of the O-rings engages the sleeve and the other O-ring engages the stationary housing. Preferably, the stationary seal ring is of metallic material. Preferably, the rotatable ring section is of a silicon carbide material. Preferably, the rotatable ring section is of a carbon material. Preferably, the O-ring is a carbon-face O-ring. Preferably, n the stationary ring section is of a stainless steel material. Preferably, the silicon carbide is a seal-grade silicon carbide. Preferably, the carbon material is a seal-grade carbon.

The present invention also includes a method of sealing a rotatable shaft mechanical seal with an assembly, wherein the seal assembly includes a sleeve that is fitted to the shaft and a stationary housing containing a chemically active fluid, comprising:

a) providing a stationary seal ring section connected to said sleeve;
b) providing a rotatable ring section connected to said sleeve;
c) providing seal faces on said seal rings opposed to one another;
d) wherein in step "c" each ring section has an annular groove;
e) placing an O-ring in each annular groove;
f) wherein one of the O-rings engages the sleeve and the other O-ring engages the stationary housing. Preferably, the stationary seal ring is of metallic metal. Preferably, the rotatable ring section is of a silicon carbide material. Preferably, the rotatable ring section is of a carbon material. Preferably, the O-ring is a carbon-face O-ring. Preferably, the stationary ring section is of a stainless steel material. Preferably, the silicon carbide is a seal-grade silicon carbide. Preferably, the carbon material is a seal-grade carbon.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

FIGS. 1-25 show the preferred embodiment of the apparatus of the present invention, designated generally by the numeral 10. Pump apparatus 10 provides a pump housing 11 that includes a pump head 12. The pump apparatus 10 can be for example be a barge pump. In general, barge pumps commercially available (see www.Flowserve.com). Barge pumps have been sold for years under the trademark Byron Jackson®.

Figures 1, 2:
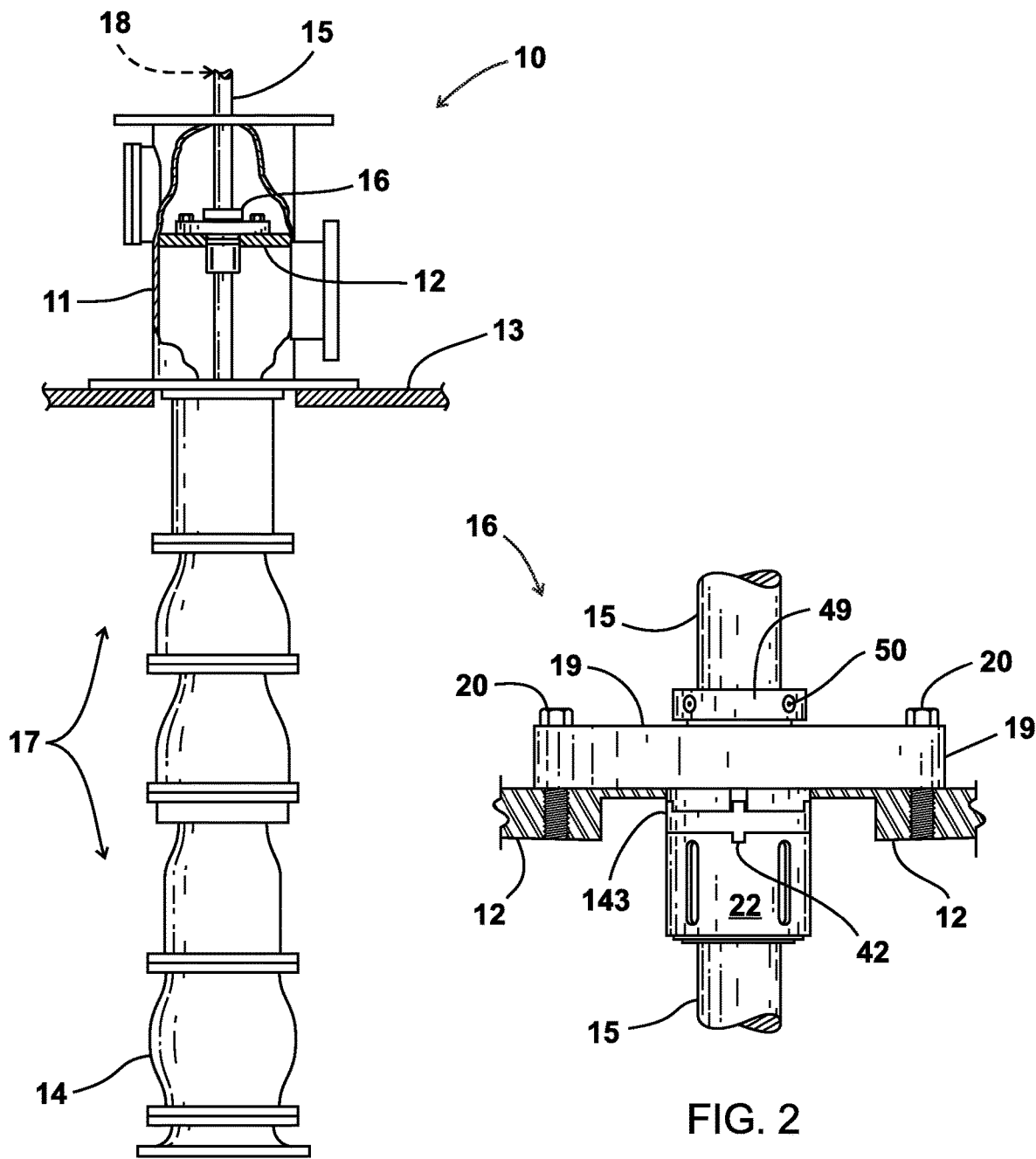
FIG. 1 is an elevation view of the preferred embodiment of the apparatus of the present invention.
FIG. 2 is a partial sectional, elevation view of the preferred embodiment of the apparatus of the present invention.

In FIG. 1, pump housing 11 is shown being attached to a deck 13 (e.g., barge deck 13). Lower end portion 14 of pump housing 11 extends below deck into a compartment 17 that contains a fluid to be pumped.

The present invention discloses an improved mechanical pump seal 16 for sealing rotary pump shaft 15 as it extends downwardly in pump housing 11. The overall configuration of pump housing 11 and shaft 15 as well as any selective shaft driver 18 (e.g. diesel engine and transmission) is known in the art. While the cargo is contained in the below deck compartment 17 that is positioned below deck 13, the mechanical seal 16 would typically be positioned above deck 13 as shown in FIG. 1.

Figure 3:
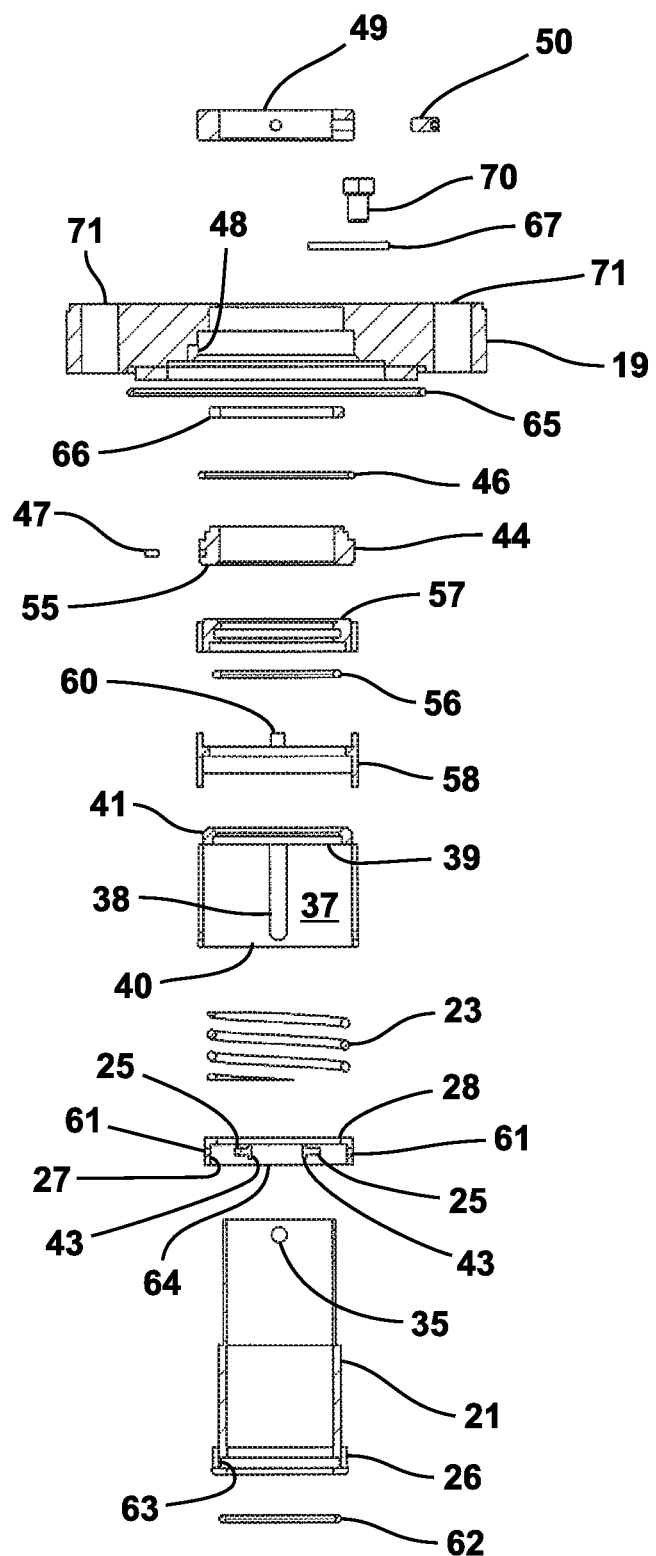
FIG. 3 is a sectional view of the preferred embodiment of the apparatus of the present invention.
Figure 16:
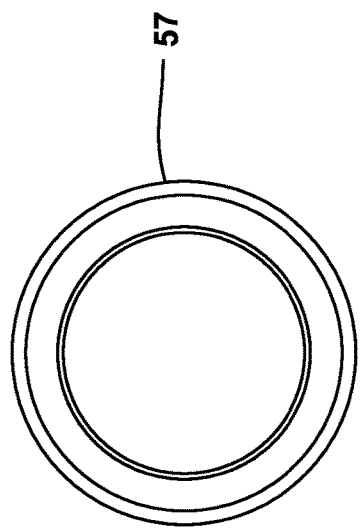
FIG. 16 is a fragmentary top view of the preferred embodiment of the apparatus of the present invention showing the upper seal member.

Mechanical seal 16 is shown more particularly in FIGS. 1-8 and 13-25. The mechanical seal 16 includes the number of different parts that are interconnected as shown in FIGS. 2-8 and 13-25. Mechanical seal 16 includes seal flange 19 which is a non-rotating part. Non-rotating seal element 44 nests in seal flange 19 as shown in FIGS. 3 and 16 and is thus a non-rotating part.

In FIGS. 3, 6-8 and 16-25, rotating seal element 143 includes an upper seal member 57 and a lower drive member 58. Upper seal member 57 includes a sealing face (flat upper surface) 56, drive slots 59, and O-ring recess 51. Lower drive member 58 includes drive lugs 60. There are at least as many drive slots 59 as drive lugs 60, and preferably the same number (four of each are shown in the drawings). Lower drive member 58 also includes two driven lugs 42.

Figure 6:
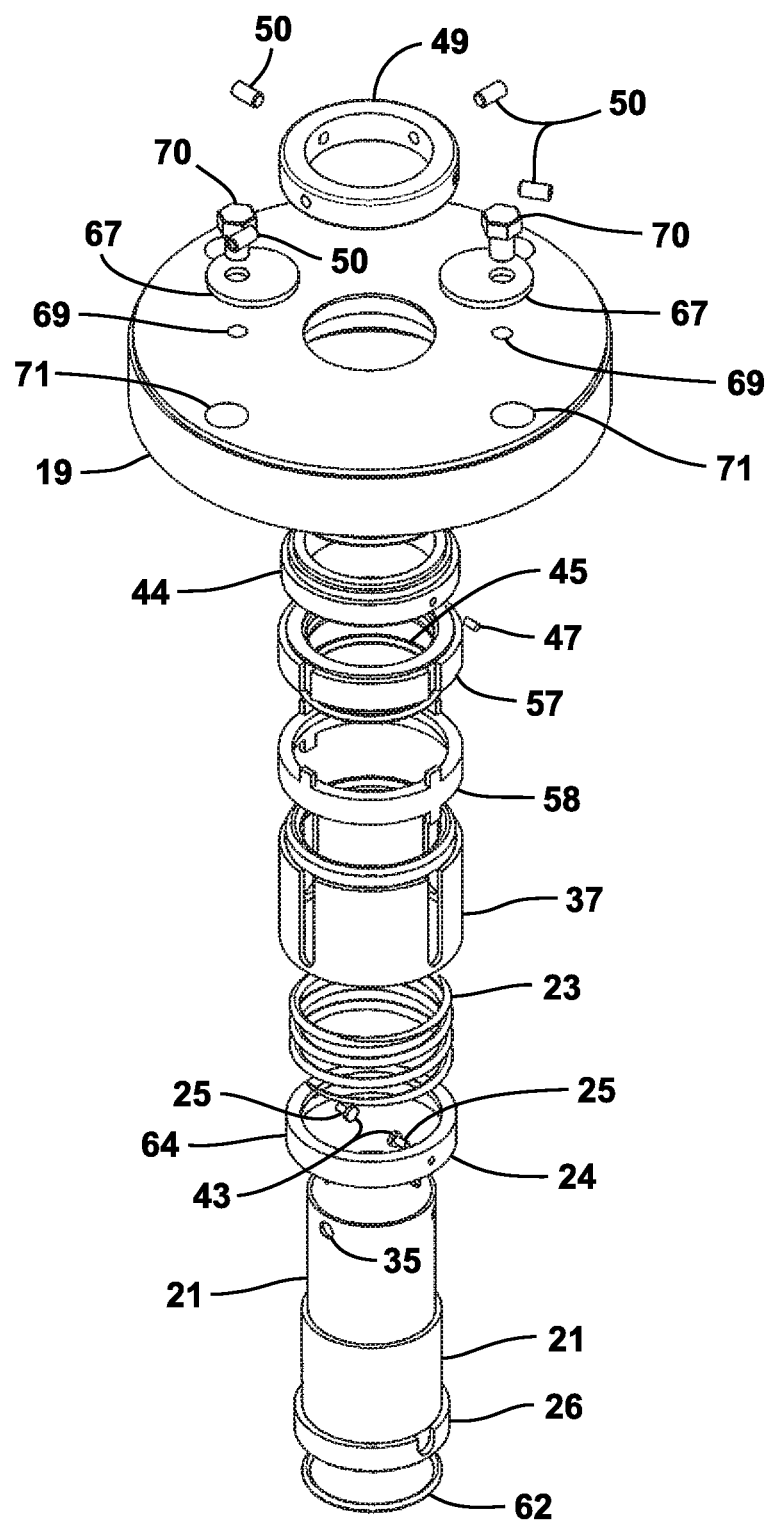
FIG. 6 is an exploded, sectional elevational view of the preferred embodiment of the apparatus of the present invention.

Rotating seal element 143 is similar to the rotating seal element or assembly 43 shown in FIG. 6 of U.S. Pat. No. 7,699,579, but instead of the unitary stainless steel rotating seal element 43, seal assembly 143 includes a stainless steel lower portion 58 and a hardened portion 57 which can for example be made of silicon carbide or tungsten carbide (or even carbon). Carbon is not preferred as it would not last as long as the carbide portions. The hardened portion can be coated using a process known as "diamond like coating" (DLC).

Having a two-part rotating seal element 143 is advantageous because the upper seal member 57 can be produced from a solid piece of material and include the O-ring 45 in that solid piece reducing leakage while the lower drive member 58 that is used to drive upper member 57 can be of metal or hard material (stainless steel). Rotating sealing face 56 can be monolithic in design. Two-part rotating seal element or seal assembly 143 provides a seal that has the lowest leak-rate of all designs repaired and tested at Industrial Pump Sales, Inc., where the inventors work. Rotating sealing face 56 can be successfully diamond coated resulting in extraordinary face durability. Rotating seal element 143 can be relatively inexpensively produced considering its high potential value to customers.

The initial pressure for a seal test is 230 PSI. In the experience of the inventors, a standard Flow Serve seal design will drop from 230 PSI to 100 PSI within the first hour of the test, while a seal 43 as shown in U.S. Pat. No. 7,699,579 will drop from 230 PSI to 100 PSI within 48 hours. The two-part rotating seal element/assembly 143 including a monolithic upper seal member 57 dropped from 230 PSI down to 200 PSI after 96 hours.

An initial two-part rotating seal element in which a carbide disc was pressed into a recess in a stainless steel lower drive member failed when disc rotated relative to member, resulting in the failure of the entire seal. This failure inspired the inventors to invent two-part rotating seal element 143 with a monolithic upper seal member 57 as shown in FIGS. 7-8 and 13-25.

Rotating seal element 143 is urged into face-to-face sealing engagement with non-rotating seal element 44 by spring cage assembly 22. Compression of the coil spring 23 of cage assembly 22 is realized by providing a larger diameter section 32 on sleeve 21 which is attached to and rotates with pump shaft 15. A drive collar 49 is attached to pump shaft 15 (using set screws 50) opposite spring cage assembly 22 and rotates with pump shaft 15. This arrangement can be seen in FIGS. 2-6.

Seal flange 19 is attached to pump head 12 with bolted connections 20. The pump head 12 can be drilled and tapped for bolts that secure the seal flange 19 to the pump head 12. The seal flange 19 can be provided with a register that centers it appropriately on the pump head 12.

The spring cage assembly 22 (FIGS. 3-6) carries a coil spring 23 in between parts 37 (cage) and 24 (ring). The part 24 is a ring that has one or more locking pins or lugs 25 that each extend through an opening 61 in ring 24 and that are circumferentially spaced such as for example 90 degrees apart or 180 degrees apart. These lugs 25 each have an enlarged head 43 that fits into slots 26 on the larger diameter section 32 of sleeve 21. Each pin or lug also connects with a slot 38 in cage 37. Thus sleeve 21, ring 24 and cage 37 rotate together. Assembly 143 also rotates with case 37, sleeve 21 and ring 24 as lugs 42 register in slots 38 of cage 37. Lugs 60 of lower member 58 engage and rotate upper seal member 57. Ring 24 has an inner bore with a larger diameter section 27 and a smaller diameter section 28 as shown in FIG. 3. An annular shoulder 29 is provided at the interface between the larger and smaller diameter sections 27, 28 as shown in FIG. 3. This annular shoulder 29 rests upon an annular shoulder 34 of sleeve 21 that is in between the larger diameter section 32 and an intermediate diameter section 31 of sleeve 21. Another annular shoulder 33 is provided on sleeve 21 in between the intermediate diameter section 31 and the smaller diameter section 30. O-ring 62 fits in annular recess 63 of sleeve 21 as seen in FIGS. 3 and 6.

A plurality of openings 35 are provided in the smaller diameter section 30 of sleeve 21. These openings 35 are preferably circumferentially spaced such as for example about 90 degrees apart. Each opening 35 is receptive of a set screw 50 of driver 49. Set screws 50 are preferably half-dog set screws such as set screws commercially available from Fastenal Corp. Thus sleeve 21 rotates with shaft 15. These half-dog set screws 50 are preferred to regular set screws because regular set screws when tightened can cause upset damage to the shaft taking up the necessary clearance needed to make seal removal possible. Also, due to the regular set screws being threaded all the way to the end (see FIG. 10) the first two or three threads on the set screw can be damaged by the seal sleeve during normal operation. These damaged set screws cannot be removed normally and must be drilled out. The half-dog set screw eliminates these two issues and also adds an improvement by allowing all four set screws 50 to contact the shaft improving seal securement to the shaft (note: normally only two of the set screws reach the shaft because the other two are typically used only to hold components together).

Ring 24 provides an open center 36 so that it fits over the smaller and intermediate sections 30, 31 of sleeve 21, enabling the annular shoulder 29 of the ring 24 to sit upon the annular shoulder 34 of sleeve 32 as shown in FIG. 3.

Figure 4:
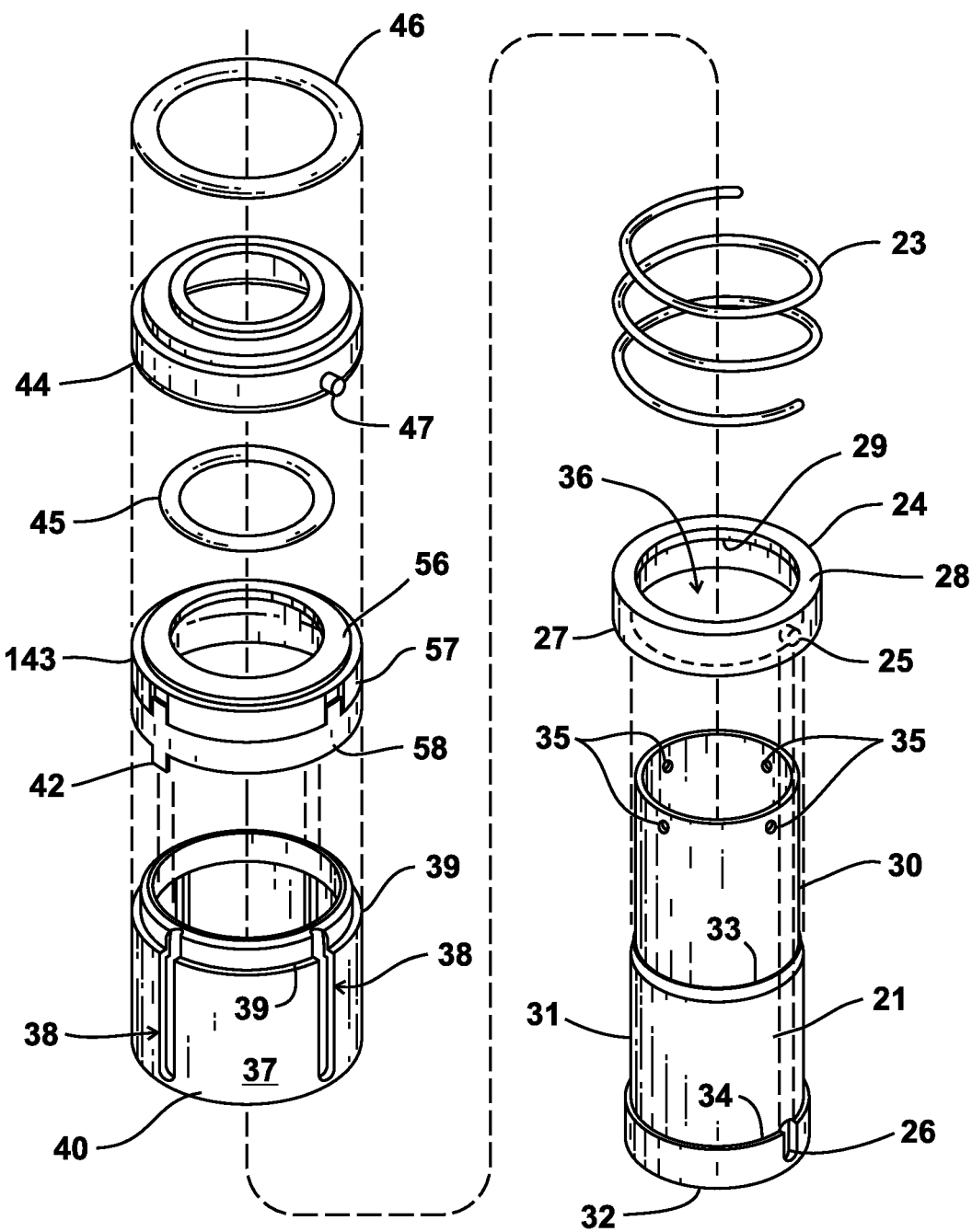
FIG. 4 is an exploded perspective view of the preferred embodiment of the apparatus of the present invention.
Figure 5:
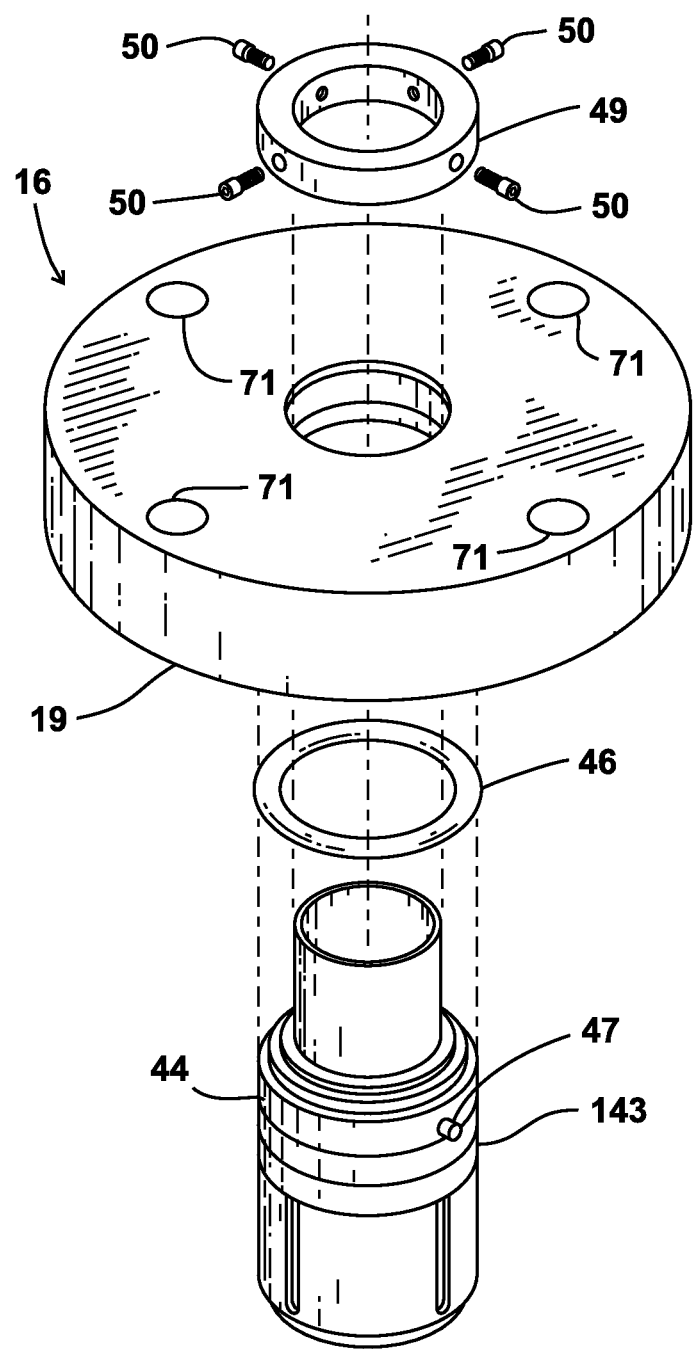
FIG. 5 is a partial exploded perspective view of the preferred embodiment of the apparatus of the present invention.

The spring cage assembly 22 includes cage 37, coil spring 23, and ring 24. The coil spring 23 fits over the intermediate diameter section 31 of sleeve 21 and is contained within cage 37 (see FIG. 3). Cage 37 provides a plurality of longitudinal slots 38. Cage 37 also provides an annular shoulder 39. Rotating seal element 143 interlocks with cage 37, the lugs 42 on rotating seal element 143 registering in the slots 38 of cage 37 as shown in FIGS. 3 and 4. The cage 37 thus provides a larger diameter section 40 that contains coil spring 23 and a smaller diameter section 41 that connects with rotating seal element 143. This interconnection can be seen in FIGS. 3 and 4.

A pair of O-rings 45, 46 are provided, one being carried by the rotating seal element 143 and another being carried by the non-rotating seal element 44. The rotating seal element 143 upper seal member 57 has an annular recess 51 or groove that is receptive of O-ring 45 as shown in FIGS. 3 and 6. The O-ring 46 fits an annular recess 52 on non-rotating seal element 44 as shown in FIGS. 3 and 6. Locking pin 47 on non-rotating seal element 44 nests in a recess 48 of seal flange 19 as shown in FIGS. 3 and 6.

In order to assemble the various components of mechanical seal 16, the sleeve 21 is first fitted with spring cage assembly 22 by placing sleeve 21 over the shaft 15. Ring 24 is lowered until ring 24 rests upon larger diameter section 32 and each pin 25 head 43 engages a slot 26. The rotating seal element 143 is then placed over the upper end portion of sleeve 21 and lowered until it registers upon spring cage assembly 22 wherein lugs 42 of drive member 58 interlock with longitudinal slots 38. Before placing the rotating seal element 143 in position, it is fitted with O-ring 45 as indicated schematically by arrows 53 in FIG. 6. The non-rotating seal element 44 is also fitted with O-ring 46 as indicated by arrows 54 in FIG. 6. The non-rotating seal element is then placed over the sleeve 21 until sealing face 55 rests upon sealing face 56 of rotating seal element 143. The non-rotating seal element 44 is preferably of a carbide material. The rotating seal element 143 can be of stainless steel (preferably for lower drive member 58), silicon carbide, tungsten carbide, ceramic, bronze, or other material as may be appropriate for the type of material being pumped (preferably tungsten carbide for upper seal member 57), so that the faces 55, 56 form a seal that when placed under compression and urged together by spring 23. This arrangement allows sealing even of gases of very small molecular diameter (unlike in the prior art where the Teflon® U-seals, once deflated, will allow gases to leak).

The O-ring 45 forms a seal with the outer surface of sleeve 21 (see FIG. 3). The O-ring 46 forms a seal with seal flange 19 (see FIG. 3). The load is transferred from pump shaft 15 to sleeve 21 using drive ring 49 and set screws 50 that extend through the drive ring 49 and through openings 35 of sleeve 21, then connecting to pump shaft 15.

The upper seal member 57 of the rotating seal assembly 143 can be made of a non-metallic material from the group consisting of silicon carbide, tungsten carbide, carbon, molded plastic, glass filled Teflon® polytetrafluoroethylene, Micarta® molded fibrous material with a heat hardened binder, and mixtures thereof. The upper seal member 57 of the rotating seal assembly 143 can alternatively be made of a metallic material from the group consisting of Stellite® cobalt-based metal alloys, 17-4PH stainless steel, bronze, silicon carbide, tooled steel, tungsten carbide, cast iron, Ni-Resist, chrome plated (steel, cast iron, stainless steel, or Ni-Resist), and mixtures thereof.

Figure 7:
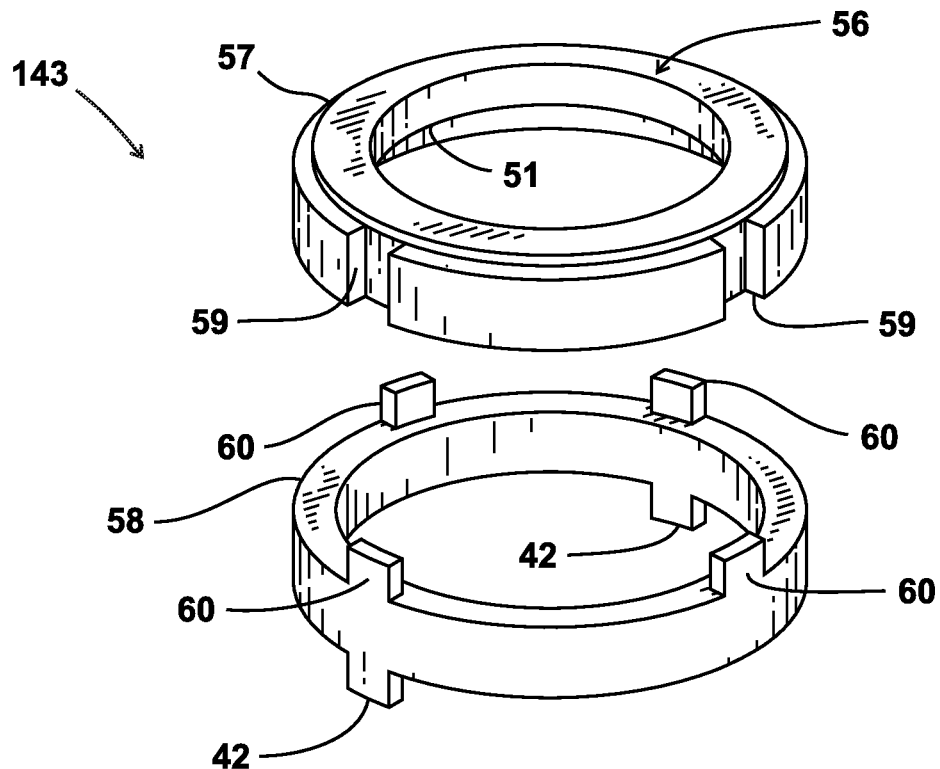
FIG. 7 is a fragmentary view of the preferred embodiment of the apparatus of the present invention.
Figure 8:
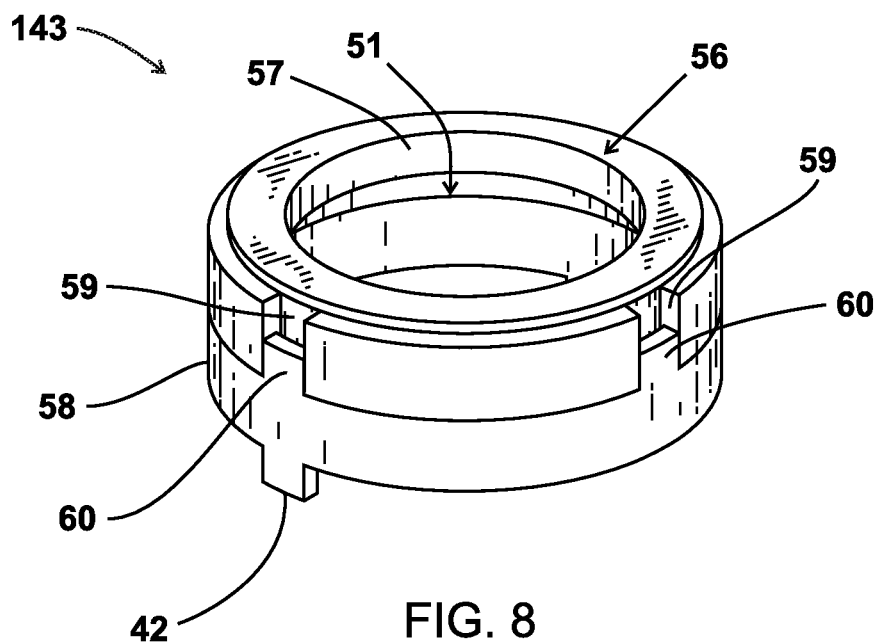
FIG. 8 is a fragmentary view of the preferred embodiment of the apparatus of the present invention.
Figure 10:
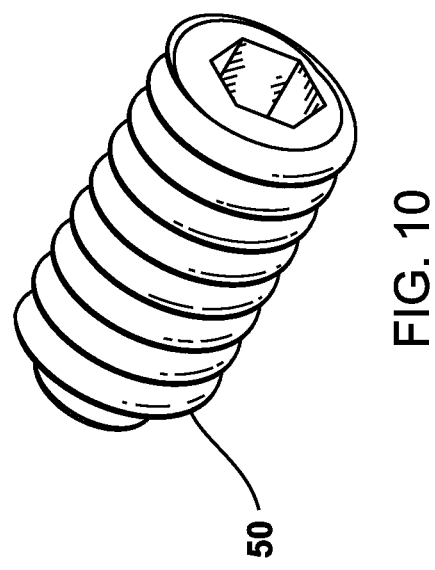
FIGS. 9-12 are fragmentary views of the half-dog point set screw (preferred for use in the present invention)
Figure 12:
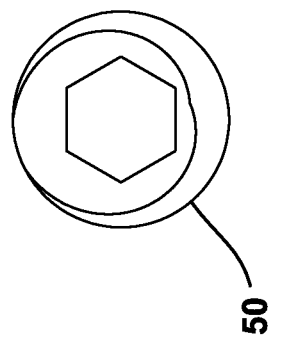
Figure 9:
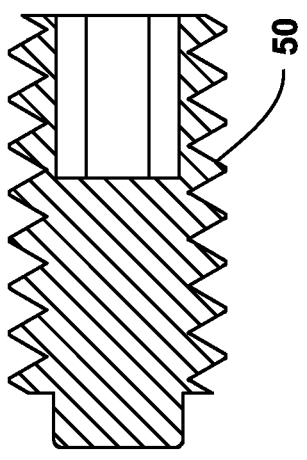
Figure 11:
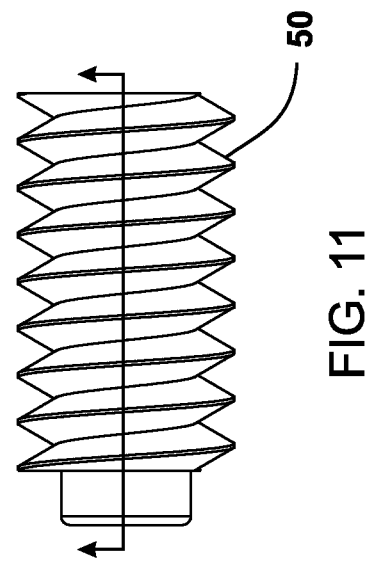
Figure 13:
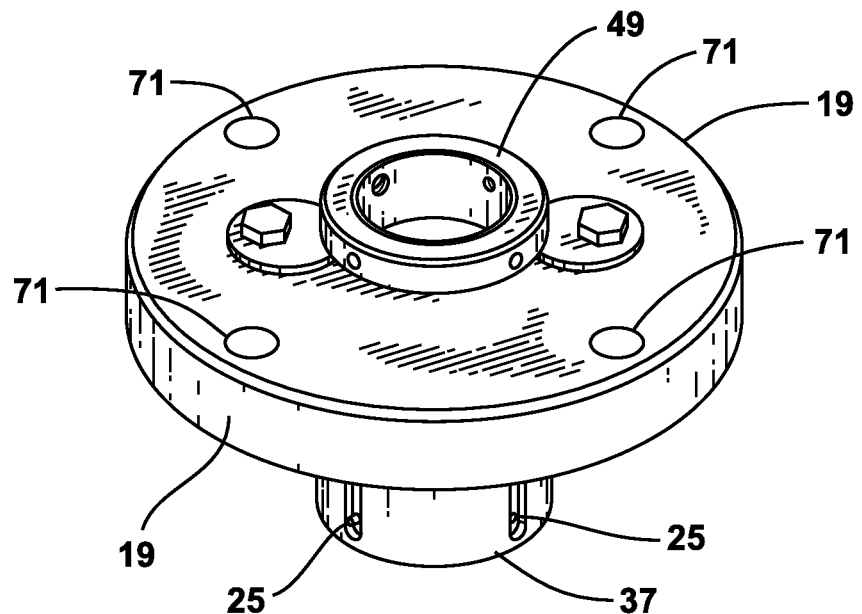
FIG. 13 is a perspective view of the preferred embodiment of the apparatus of the present invention.
Figure 14:
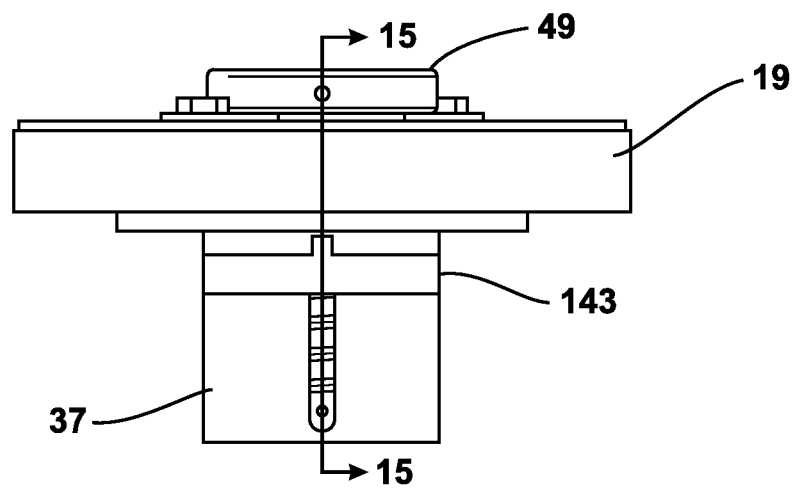
FIG. 14 is an elevation view of the preferred embodiment of the apparatus of the present invention.
Figure 15:
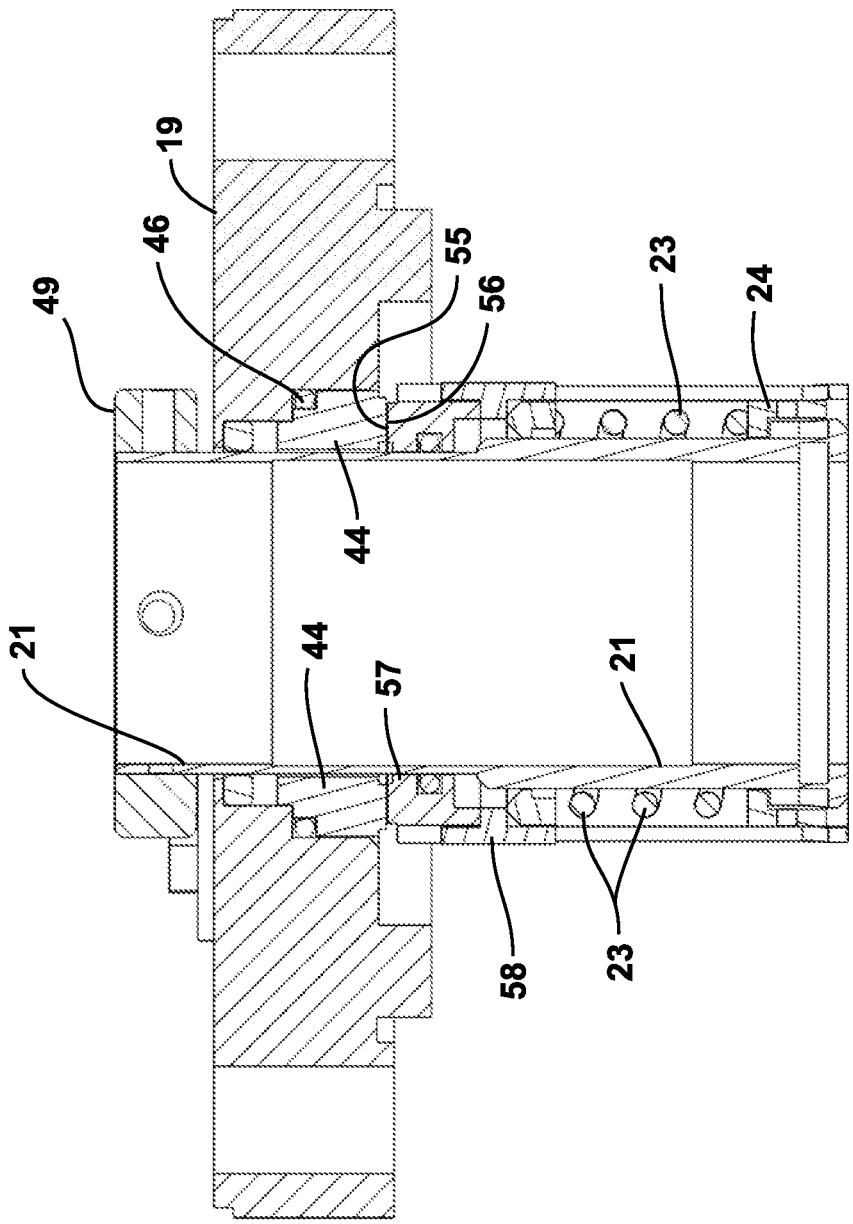
FIG. 15 is a sectional view of the preferred embodiment of the apparatus of the present invention.
Figure 17:
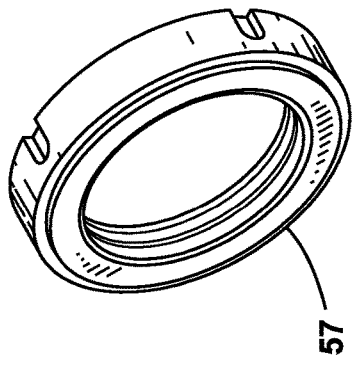
FIG. 17 is a perspective view of the upper seal member.
Figure 19:
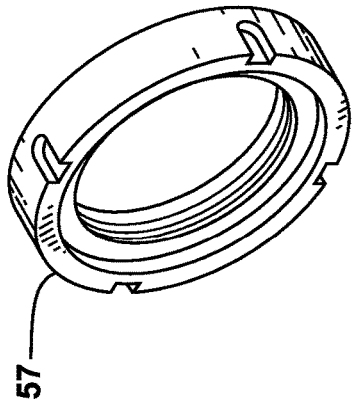
FIG. 19 is a perspective view of the upper seal member.
Figure 21:
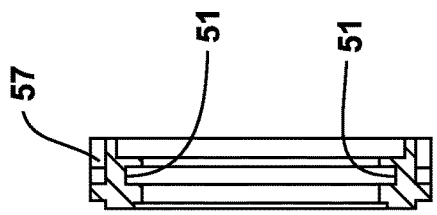
FIG. 21 is a sectional elevational view of the upper seal member.
Figure 18:
FIG. 18 is a fragmentary side view of the preferred embodiment of the apparatus of the present invention showing the upper seal member.
Figure 20:
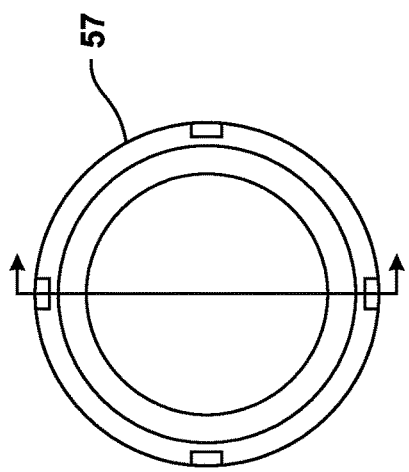
FIG. 20 is a fragmentary bottom view of the preferred embodiment of the apparatus of the present invention showing the upper seal member.
Figure 23:
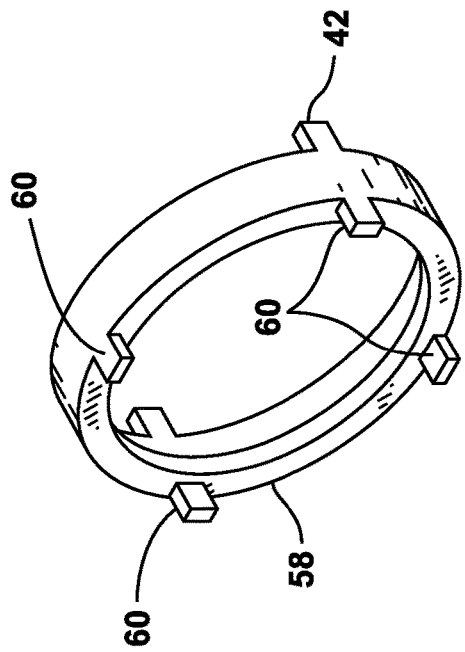
FIG. 23 is a perspective view of the lower seal member.
Figure 25:
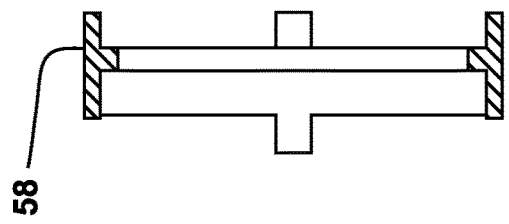
FIG. 25 is a sectional view of the lower seal member.
Figure 22:
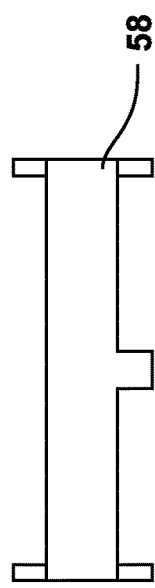
FIG. 22 is a fragmentary side view of the lower seal member.
Figure 24:
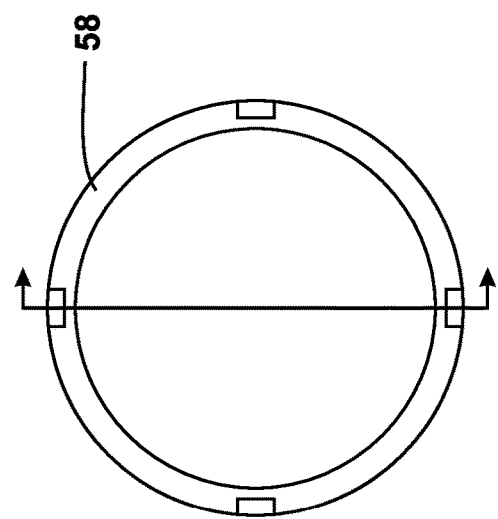
FIG. 24 is a top view of the lower seal member.

It is easier to manufacture upper seal member 57 having slot 59 go all the way through as shown in FIG. 7, rather than have a closed slot as shown in FIGS. 18 and 20, but either could be used and the sealing potential is the same with either option.

Spring base 64 is received in spring housing 37, and pins 25 connect to slots 38 in spring housing 37, and pin heads 43 are received in slots 26 in the bottom of sleeve 21.

Sleeve 21 can be unitary, and is preferably made by milling and turning and grinding to create all shapes seen in drawings.

The following is a list of parts and materials suitable for use in the present invention.

PARTS LIST

Part Number Description
10 pump apparatus
11 pump housing
12 pump head
13 barge deck
14 lower end portion
15 pump shaft
16 mechanical seal
17 below deck compartment
18 driver
19 seal flange
20 bolted connection
21 sleeve
22 spring cage assembly
23 coil spring
24 ring
25 lug/locking pin
26 slots in sleeve 21 (180 degrees apart)
27 larger diameter section
28 smaller diameter section
29 annular shoulder
30 smaller diameter section
31 intermediate diameter section
32 larger diameter section
33 annular shoulder
34 annular shoulder
35 opening
36 open center
37 cage
38 longitudinal slot
39 annular shoulder
40 larger diameter section
41 smaller diameter section
42 driven lug of lower drive member 58 of rotating seal element 143
43 head of pin 25
44 non-rotating seal element
45 O-ring in recess 51 in upper seal member 57 of rotating seal element 143
46 stationary face O-ring
47 locking pin
48 recess
49 drive collar
50 set screws (preferably half-dog set screws such as ¼" diameter 20 TPI (threads per inch) "half-dog point" set screws ½ inch long commercially available from Fastenal Corp.)
51 recess in upper seal member 57 of rotating seal element 143
52 recess
53 arrow
54 arrow
55 sealing face
56 sealing face (flat upper surface) of upper seal member 57 of rotating seal element 143
57 upper seal member of rotating seal element 143
58 lower drive member of rotating seal element 143
59 drive slots in upper seal member 57 of rotating seal element 143
60 drive lug of lower drive member 58 of rotating seal element 143
61 opening in spring base 64
62 sleeve O-ring
63 annular recess
64 spring base
65 flange O-ring
66 crash bushing
67 preset spacer
69 threaded opening
70 spacer retaining bolts
71 openings
143 rotating seal element/seal assembly All measurements disclosed herein are at standard temperature and pressure, at sea level on Earth, unless indicated otherwise.

The foregoing embodiments are presented by way of example only; the scope of the present invention is to be limited only by the following claims.

The invention claimed is:
1. A pump seal apparatus for sealing leakage around a pump shaft of a pump having a pump housing and a driver that rotates the pump shaft relative to the housing, said seal apparatus comprising:
a) a seal flange that is attachable to the pump housing, the seal flange having a central flange opening for receiving the pump shaft and an annular socket surrounding the central flange opening;
b) a sleeve attachable to the pump shaft and rotating therewith;
c) an annular non-rotating seal element that seats upon the seal flange annular socket and connects to the seal flange, the non-rotating seal element providing a carbon containing sealing face;
d) an annular rotating seal assembly, the annular rotating seal assembly including an upper seal member and a lower drive member, the upper seal member being made of a first material and the lower drive member being made of a second material that is not said first material, the upper seal member and the lower drive member being removably interlocked such that movement of the lower drive member causes movement of the upper seal member, the upper seal member being in face-to-face sealing contact with the carbon containing sealing face, said rotating seal assembly having an open center and being mounted upon the sleeve at the open center, the contact defining a gas seal that prevents leakage of gas molecules, the sealing face and the upper seal member of the rotating seal assembly each having a flatness of not more than two light bands;

e) a cage below the drive member;

f) the cage having a spring assembly that biases the seal elements together;

g) one or more O-rings that are carried by the seal assembly; and h) wherein the lower drive member is removably interlocked with the cage for rotation therewith.

2. The pump seal apparatus of claim 1, wherein the non-rotating seal element is of a seal-grade silicon carbide.

3. The pump seal apparatus of claim 1, wherein the non-rotating seal element is of a seal-grade carbon material.

4. The pump seal apparatus of claim 1, wherein the non-rotating seal element is of a non-metallic material.

5. The pump seal apparatus of claim 4, wherein the lower drive member of the rotating seal assembly is of a stainless steel material.

6. The pump seal apparatus of claim 4, wherein the upper seal member of the rotating seal assembly is of a non-metallic material from the group consisting of silicon carbide, tungsten carbide, carbon, molded plastic, glass filled Teflon® polytetrafluoroethylene, Micarta® molded fibrous material with a heat hardened binder, and mixtures thereof.

7. The pump seal apparatus of claim 4, wherein the upper seal member of the rotating seal assembly is of a metallic material from the group consisting of Stellite® cobalt-based metal alloys, 17-4PH stainless steel, bronze, silicon carbide, tooled steel, tungsten carbide, cast iron Ni-Resist, chrome plated (steel, cast iron, stainless steel, or Ni-Resist), and mixtures thereof.

8. The pump seal apparatus of claim 1 further comprising a spring that urges the seal elements together.

9. The pump seal apparatus of claim 1, wherein one or more of the O-rings are of a Kalrez® brand material or generic equivalents thereof.

10. The pump seal apparatus of claim 8, wherein the sleeve has an annular shoulder that transfers load between the sleeve and the spring.

11. The pump seal apparatus of claim 10, wherein the spring rotates with the sleeve.

12. A mechanical pump seal assembly for sealing a rotatable pump shaft, comprising:

a) a sleeve that is fittable to the pump shaft for rotation therewith;

b) a stationary seal ring section surrounding the pump shaft;

c) a rotatable seal ring section connected to said sleeve, the rotatable ring section including an upper seal member and a lower drive member, the upper seal member being made of a first material and the lower drive member being made of a second material, the upper seal member and the lower drive member being removably interlocked such that movement of the lower drive member causes movement of the upper seal member;

d) seal faces on said seal ring sections opposed to one another, the seal face on the rotatable seal ring section being on the upper seal member;

e) wherein each ring section has an annular groove;

f) an O-ring that occupies each annular groove;

g) wherein one of the O-rings engages the sleeve and surrounding the pump shaft;

h) a cage below the drive member that rotates with said sleeve; and i) wherein the lower drive member is removably interlocked with the cage for rotation therewith.

13. The seal assembly of claim 12, wherein the stationary seal ring is of metallic material.

14. The seal assembly of claim 12, wherein the upper seal member of the rotatable ring section is a material from the group consisting of silicon carbide, tungsten carbide, carbon, and mixtures thereof.

15. The seal assembly of claim 12, wherein the upper seal member of the rotatable ring section is of a carbon material.

16. The seal assembly of claim 12, wherein the O-ring is a carbon-face O-ring.

17. The seal assembly of claim 13, wherein the stationary ring section is of a stainless steel material.

18. The seal assembly of claim 14, wherein the silicon carbide is a seal-grade silicon carbide.

19. The seal assembly of claim 15, wherein the carbon material is a seal-grade carbon.

20. A method of sealing a rotatable shaft mechanical seal with a seal assembly, wherein the seal assembly includes a sleeve that is fitted to a pump shaft and a stationary housing containing a chemically active fluid, comprising:

a) providing a stationary seal ring section connected to said housing;

b) providing a rotatable seal ring assembly connected to said sleeve, the rotatable ring assembly including an upper seal member removably interlocked with a lower drive member, the upper seal member being made of a first material and the lower drive member being made of a second material that is not said first material, the upper seal member and the lower drive member being connected such that movement of the lower drive member causes movement of the upper seal member;

c) providing seal faces on said seal ring sections opposed to one another, the seal face on the rotatable seal ring assembly being on the upper seal member;

d) wherein in step "c" each ring section has an annular groove;

e) placing an O-ring in each annular groove;

f) wherein one of the O-rings engages the sleeve and the other O-ring engages the stationary housing;

g) placing a cage below the lower drive member and surrounding the pump shaft, said cage having a spring;

h) rotating the lower drive member and cage together by interlocking the lower drive member and the cage; and i) biasing the stationary seal ring section and upper seal member together with the spring of step "g".

* * * * *